under 35 U.S.C. 154(b) by 450 days.

(12) United States Patent
Frankovics et al.

(10) Patent No.: US 12,194,985 B2
(45) Date of Patent: Jan. 14, 2025

(54) TRAILER SWAY MITIGATION WITH STEERING SYSTEMS

(71) Applicant: Robert Bosch GmbH, Stuttgart (DE)

(72) Inventors: Achim Frankovics, Novi, MI (US); Joseph Andrew McAuliffe, Whitmore Lake, MI (US); Jack Nathan Miller, Canton, MI (US); Trevor James Nill, Macomb, MI (US)

(73) Assignee: Robert Bosch GmbH, Stuttgart (DE)

( * ) Notice: Subject to any disclaimer, the term of this patent is extended or adjusted under 35 U.S.C. 154(b) by 450 days.

(21) Appl. No.: 17/690,917

(22) Filed: Mar. 9, 2022

(65) Prior Publication Data

US 2023/0286492 A1    Sep. 14, 2023

(51) Int. Cl.
*B60W 30/02* (2012.01)
*B60W 10/18* (2012.01)
*B60W 10/20* (2006.01)

(52) U.S. Cl.
CPC ............ *B60W 30/02* (2013.01); *B60W 10/18* (2013.01); *B60W 10/20* (2013.01); *B60W 2520/105* (2013.01); *B60W 2520/14* (2013.01); *B60W 2530/203* (2020.02); *B60W 2710/18* (2013.01); *B60W 2710/20* (2013.01); *B60W 2720/14* (2013.01)

(58) Field of Classification Search
CPC ...... B60W 30/02; B60W 10/18; B60W 10/20; B60W 2520/105; B60W 2520/14; B60W 2530/203; B60W 2710/18; B60W 2710/20; B60W 2720/14
See application file for complete search history.

(56) References Cited

U.S. PATENT DOCUMENTS

| | | |
|---|---|---|
| 7,640,089 B2 | 12/2009 | Deng et al. |
| 8,010,252 B2 | 8/2011 | Getman et al. |
| 8,010,253 B2 | 8/2011 | Getman et al. |
| 8,046,147 B2 | 10/2011 | Waldbauer et al. |
| 8,326,504 B2 | 12/2012 | Wu et al. |
| 9,061,663 B2 | 6/2015 | Wu et al. |
| 10,919,572 B2 | 2/2021 | Kasaiezadeh Mahabadi et al. |
| 10,940,888 B2 | 3/2021 | Kim |
| 2006/0204347 A1 | 9/2006 | Waldbauer et al. |
| 2009/0105906 A1* | 4/2009 | Hackney ............... B60T 8/1755 701/99 |

(Continued)

FOREIGN PATENT DOCUMENTS

| | | | | |
|---|---|---|---|---|
| CN | 107380155 A | * | 11/2017 | ............. B60K 23/04 |
| DE | 102005028787 A1 | * | 5/2006 | ................ B60T 7/12 |

(Continued)

*Primary Examiner* — Hung Q Nguyen
(74) *Attorney, Agent, or Firm* — Michael Best & Friedrich LLP

(57) ABSTRACT

A system for mitigating a sway of a trailer. The system includes a sensor set configured to sense a plurality of operating characteristics of a vehicle and an electronic processor connected to the sensor set. The electronic processor is configured to receive the plurality of operating characteristics from the sensor set, determine whether the trailer is swaying based on the plurality of operating characteristics, determine, in response to the trailer swaying, a target deceleration, determine, in response to the trailer swaying, a target yaw value, and modify a current yaw value to counter the trailer sway until reaching the target yaw value.

16 Claims, 5 Drawing Sheets

(56) References Cited

U.S. PATENT DOCUMENTS

2011/0029210 A1    2/2011  Wu et al.
2017/0361834 A1*  12/2017  Paskus ................. B60T 8/1708

FOREIGN PATENT DOCUMENTS

| DE | 102016000306 A1 | * | 7/2017 | |
|----|----|----|----|----|
| JP | 2019116145 A | * | 7/2019 | |
| KR | 20090100018 A | * | 9/2009 | |
| WO | 0206101 A1 | | 1/2002 | |
| WO | WO-2011042966 A1 | * | 4/2011 | ............... B60T 7/20 |
| WO | 2012171764 A1 | | 12/2012 | |
| WO | WO-2019146594 A1 | * | 8/2019 | ............. B60T 8/175 |
| WO | WO-2019152054 A1 | * | 8/2019 | |
| WO | WO-2021041848 A1 | * | 3/2021 | ............... B60D 1/30 |

* cited by examiner

TRAILER SWAY MITIGATION WITH STEERING SYSTEMS

BACKGROUND

Embodiments, examples, and aspects relate to, among other things, a system and method for trailer sway mitigation with steering systems.

SUMMARY

Some existing vehicles that are capable of towing a trailer have a trailer sway mitigation system. Trailer sway often occurs due to perpendicular forces acting on the trailer that cause the trailer to move side to side behind a tow vehicle. Trailer sway can increase the amount of effort needed to control the tow vehicle. In some cases, trailer sway mitigation is performed solely via vehicle braking systems. However, in some cases lowering the vehicle speed alone is not sufficient to control oscillations of the vehicle and trailer.

Examples described herein provide, among other things, a system and method for trailer sway mitigation using vehicle steering.

One example provides a system for mitigating a sway of a trailer. The system includes a sensor set configured to sense a plurality of operating characteristics of a vehicle and an electronic processor connected to the sensor set. The electronic processor is configured to receive the plurality of operating characteristics from the sensor set, determine whether the trailer is swaying based on the plurality of operating characteristics, determine, in response to the trailer swaying, a target deceleration, determine, in response to the trailer swaying, a target yaw value, and modify a current yaw value to counter the trailer sway until reaching the target yaw value.

Another example provides a method for mitigating a sway of a trailer using a vehicle steering system. The method includes receiving, via a sensor set, a plurality of operating characteristics of a vehicle, determining, via a controller, if the trailer is swaying, determining, via the controller, a target deceleration, and determining, via the controller, a target yaw value. The method also includes controlling the vehicle steering system based on a current yaw value to counter the trailer sway until the target yaw value is reached.

Yet another example provides a method for mitigating a sway of a trailer. The method includes receiving, via sensor set, a plurality of operating characteristics of a vehicle, determining, via a controller, if the trailer is swaying, determining, via the controller, a target deceleration, determining, via the controller, a target yaw value, and determining, via the controller, an offset yaw value. The method also includes modifying a current yaw value to counter the trailer sway until the target yaw value plus the offset yaw value is reached.

Other features, aspects, and benefits of various embodiments will become apparent by consideration of the detailed description and accompanying drawings.

DETAILED DESCRIPTION

Figure 1:
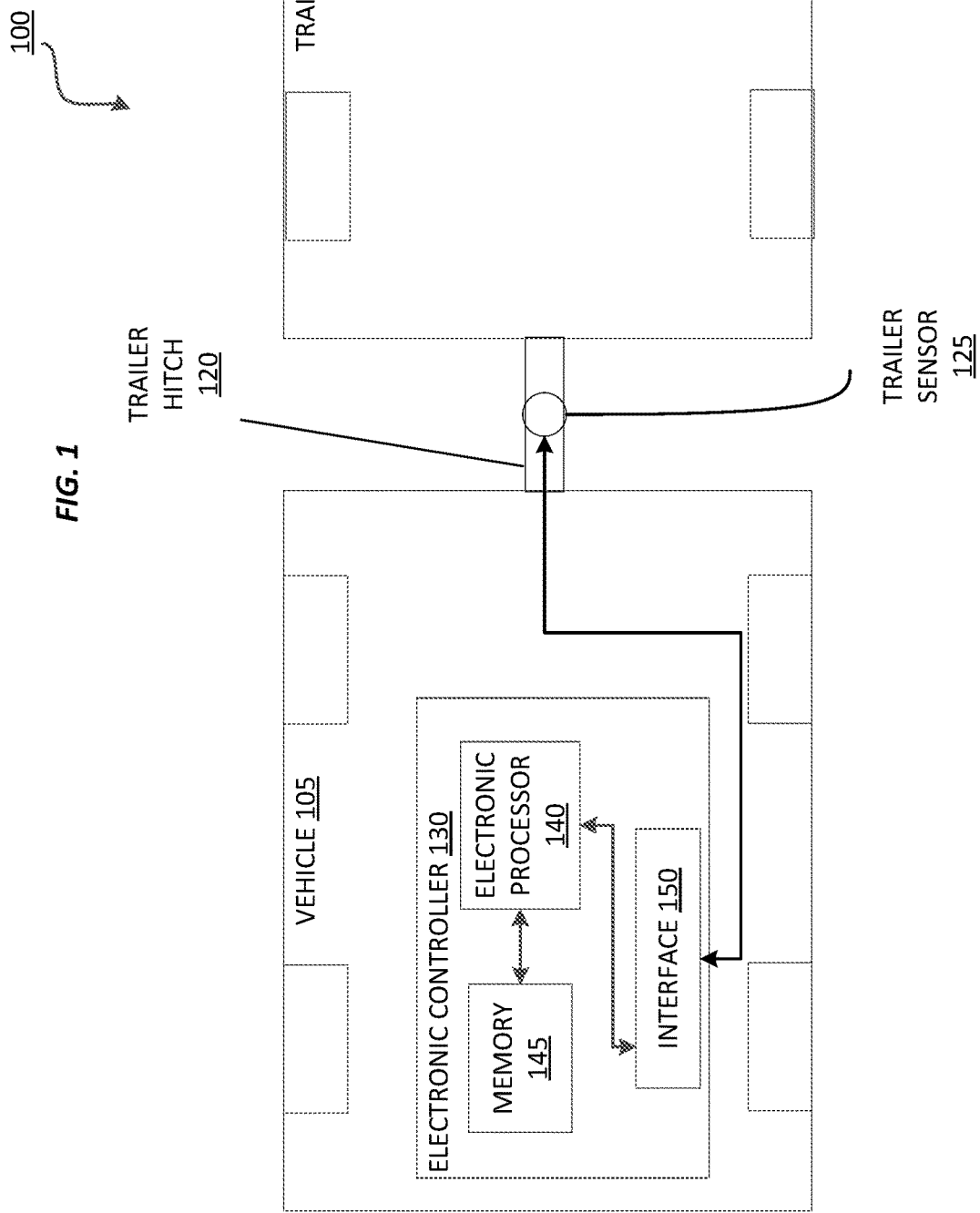
FIG. 1 is a block diagram of a system for mitigating trailer sway with steering systems according to one example.

One or more examples are described and illustrated in the following description and accompanying drawings. These examples are not limited to the specific details provided herein and may be modified in various ways. Furthermore, other examples may exist that are not described herein. For example, a device or structure that is "configured" in a certain way is configured in at least that way but may also be configured in ways that are not listed. Furthermore, some examples described herein may include one or more electronic processors configured to perform the described functionality by executing instructions stored in non-transitory, computer-readable medium. Similarly, examples described herein may be implemented as non-transitory, computer-readable medium storing instructions executable by one or more electronic processors to perform the described functionality. As used in the present application, "non-transitory computer-readable medium" comprises all computer-readable media but does not include a transitory, propagating signal. Accordingly, non-transitory computer-readable medium may include, for example, a hard disk, a CD-ROM, an optical storage device, a magnetic storage device, ROM (Read Only Memory), RAM (Random Access Memory), register memory, a processor cache, other memory and storage devices, or combinations thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms, for example, first and second, top and bottom, and the like may be used herein solely to distinguish one entity or action from another entity or action without necessarily requiring or implying any actual such relationship or order between such entities or actions.

A plurality of hardware and software-based devices, as well as a plurality of different structural components may be used to implement various examples. In addition, examples may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one example, the electronic based aspects of the invention may be implemented in software (for example, stored on non-transitory computer-readable medium) executable by one or more processors. For example, "control units" and "controllers" described in the specification can include one or more electronic processors, one or more memory modules including non-transitory computer-readable medium, one or more communication interfaces, one or more application specific integrated circuits (ASICs), and various connections (for example, a system bus) connecting the various components. It should be understood that although certain drawings illustrate hardware and software located within particular devices, these depictions are for illustrative purposes only. In some examples, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

In some examples, method steps are conducted in an order that is different from the order described.

FIG. 1 illustrates one example of a system 100 for mitigating trailer sway. The system 100 includes a vehicle 105 and a trailer 110. The vehicle 105, although illustrated as a four-wheeled vehicle, may encompass various types and designs of vehicles. For example, the vehicle 105 may be an automobile, a motorcycle, a truck, a bus, a semi-tractor, and others. The trailer 110 although illustrated as a four-wheeled trailer, may encompass various types and designs of trailers. For example, the trailer 110 may include two wheels instead of four. The vehicle 105 and the trailer 110 are connected via a trailer hitch 120 that is mounted to the vehicle 105 and extends to the trailer 110. In some instances, the vehicle 105 or the trailer hitch 120 includes a trailer sensor 125 that is configured to detect the presence of the trailer 110 or the connection of trailer 110 to vehicle 105. In some instances, the presence of the trailer 110 may be determined without using the trailer sensor 125. For example, a weight sensor in the vehicle 105 may be used to provide information to determine or estimate the mass of the vehicle 105 and trailer 110. If the sensed weight or mass is greater than the known mass of the vehicle 105 (for example, as provided by the vehicle manufacturer), the system may assume that the vehicle 105 is hitched to the trailer 110 and, therefore, that the trailer 110 is present. In another example, multiple accelerometers in the vehicle 105 may be used to provide information to determine or estimate acceleration measurements of the vehicle 105 and the trailer 110. The acceleration measurements may be used to estimate applied forces (for example, braking forces, acceleration forces, steering forces, etc.) acting on the vehicle 105 and the trailer 110. The applied force estimates and acceleration measurements may be used to estimate the mass of the vehicle 105 and the trailer 110. In some instances, the trailer sensor 125 may sense an electrical connection between an electrical system of the vehicle 105 (for example, the vehicle brake light system) and an electrical system of the trailer 110 (for example, the trailer brake light system). When an electrical connection is sensed, the system may assume that a vehicle 105 is present. Trailer presence may be detected in other ways, for example, trailer presence may be detected via the vehicle braking system 210 by sensing a torque value that is indicative that the trailer 110 is connected to vehicle 105 (for example, the brake torque is greater than known brake torque values used to brake the vehicle 105 without the weight of the trailer 110).

In the example shown in FIG. 1, the vehicle 105 includes an electronic controller 130. In the example shown, the electronic controller 130 includes a plurality of electrical and electronic components that provide power, operation control, and protection to the components and modules within the electronic controller 130. The electronic controller 130 includes, among other things, an electronic processor 140 (such as a programmable electronic microprocessor, microcontroller, or similar device), a memory 145 (for example, a non-transitory, machine readable medium), and an interface 150. The electronic processor 140 is communicatively connected to the memory 145 and the interface 150. In some instances, the trailer sensor 125 is communicatively connected to the electronic processor 140 via the interface 150. In some examples, the electronic processor 140, in coordination with software stored in the memory 145 and information from the sensors, is configured to implement, among other things, the methods described herein.

The electronic controller 130 may be implemented in several independent controllers (for example, programmable electronic controllers) each configured to perform specific functions or sub-functions. Additionally, the electronic controller 130 may contain sub-modules that include additional electronic processors, memory, or application specific integrated circuits (ASICs) for handling communication functions, processing of signals, and application of the methods listed below. In other examples, the electronic controller 130 includes additional, fewer, or different components.

The memory 145 is a non-transitory computer readable medium that includes, for example, a program storage area and a data storage area. The program storage area and the data storage area can include combinations of different types of memory, for example read-only memory ("ROM"), random access memory ("RAM") (for example, dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. In one example, the electronic processor 140 is connected to the memory 145 and executes software instructions that are capable of being stored in a RAM of the memory 145 (for example, during execution), a ROM of the memory 145 (for example, on a generally permanent basis), or another non-transitory computer-readable medium. The software includes, for example, firmware, one or more applications, program data, filters, rules, one or more program modules, and other executable instructions. The electronic processor 140 is configured to retrieve from the memory 145 and execute, among other things, instructions related to the control processes and methods described herein.

Figure 2:
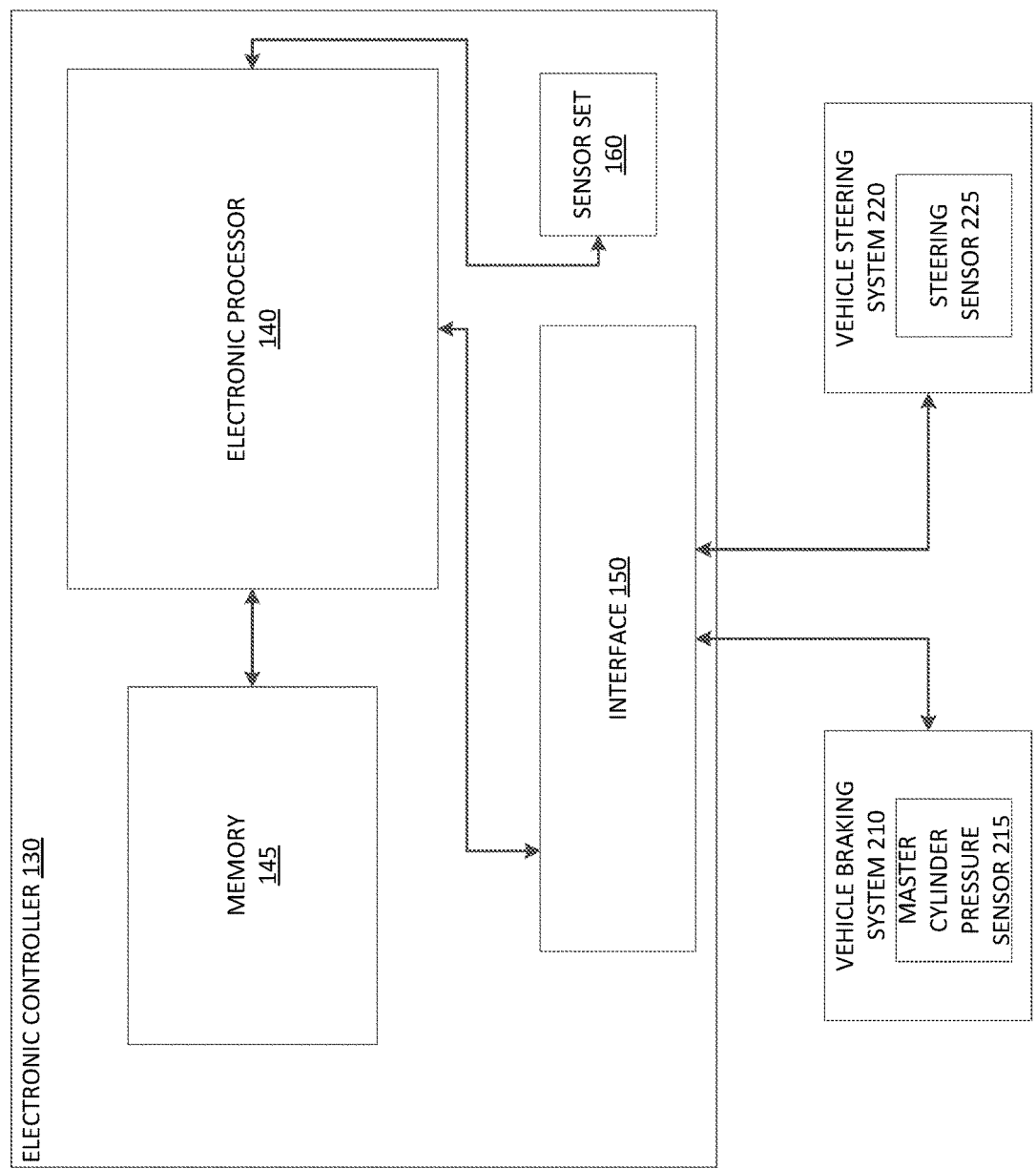
FIG. 2 is a block diagram of an electronic controller of the system of FIG. 1 interfaced with a vehicle braking system and a vehicle steering system for mitigating trailer sway according to one example.

FIG. 2 illustrates one example of a system 200 for mitigating trailer sway that includes the electronic controller 130 of FIG. 1, a vehicle braking system 210, a master cylinder pressure sensor 215, a vehicle steering system 220, and a steering sensor 225. In the example illustrated in FIG. 2, the electronic controller 130 also includes a sensor set 160 that is electrically connected to the electronic processor 140. In one instance, the sensor set 160 includes multiple sensors, for example, accelerometers to sense x-axis, y-axis, and z-axis accelerations and a yaw-rate sensor. In some instances, the sensor set 160 is similar to sensor sets used in an electronic stability control (ESC) unit and similar vehicle control systems. In a broader sense, the sensor set 160 may be viewed as being configured to sense operating characteristics of the vehicle 105 and, as a consequence of the mechanical linkage between the two, the trailer 110. In some instances, phenomena sensed by the sensor set 160 is processed by the electronic processor 140 to determine operating characteristics of the vehicle 105 and trailer 110. In some instances, information from the master cylinder pressure sensor 215, steering sensor 225, and other sensors (for example, wheel speed sensors) is also provided to the electronic processor 140 and processed by the electronic processor 140 to determine the operating characteristics.

The electronic processor 140 is electrically connected (or communicatively coupled) to the vehicle braking system 210 and the vehicle steering system 220 via the interface 150. The master cylinder pressure sensor 215 is configured to sense a pressure differential in the vehicle braking system 210. The electronic processor 140 is configured to determine the brake torque applied by the vehicle braking system 210 based on the pressure differential sensed by the master cylinder pressure sensor 215. In some instances, the pressure differential may be modeled at a multitude of brake calipers of the vehicle 105 by the electronic processor 140 based on the sensed pressure differential information from the master cylinder pressure sensor 215. A relationship between the brake torque and the brake pressure may be estimated by the electronic processor 140 using the pressure differential model to determine the brake torque applied to the vehicle braking system 210. In some instances, the electronic processor 140 may be configured to determine the brake torque applied by the vehicle braking system 210 based on a brake torque value sensed by a brake torque sensor of the vehicle braking system 210. The steering sensor 225 is configured to sense the steering wheel angle of a steering wheel of the vehicle steering system 220. The electronic processor 140 is further configured to determine if oscillation of the vehicle 105 and trailer 110 is present based on the current yaw rate, steering wheel angle, current braking torque, speed of the vehicle 105, and current acceleration or current deceleration of vehicle 105 provided by the sensor set 160 and other sensors. The electronic processor 140 (or other electronic processors in the vehicle 105) may be configured to control the vehicle braking system 210 and the vehicle steering system 220 in order to mitigate trailer sway once the trailer sway has been detected by sensor set 160 (and/or other sensors) as described in greater detail herein. In some instances, the weight, height, and width of the vehicle 105 and other vehicle parameters are known values, for example, values provided by the vehicle manufacturer. In some cases, these parameters are sensed by other sensors.

Figure 3:
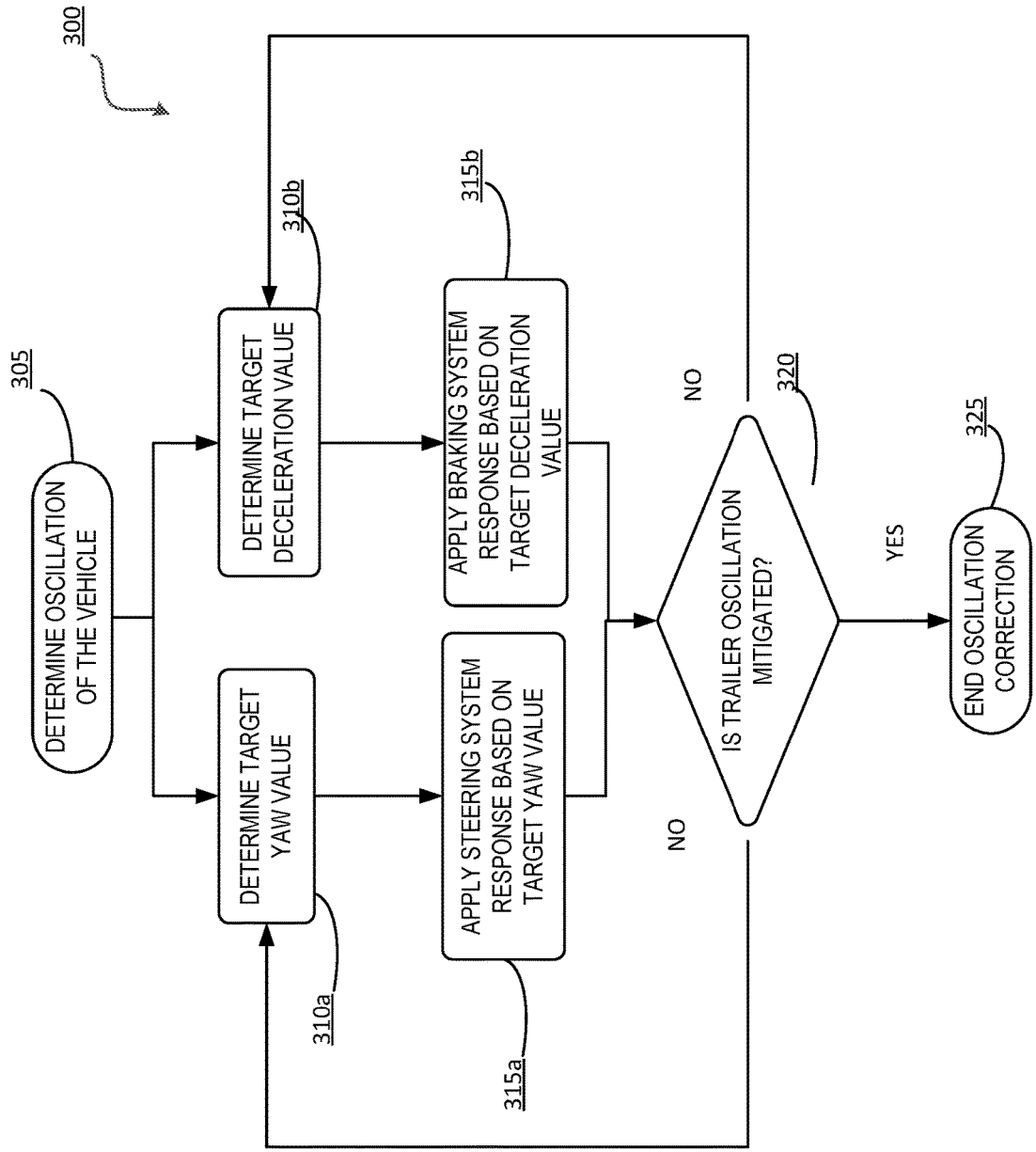
FIG. 3 illustrates a flow chart of a method for mitigating trailer sway with steering systems according to one example.

FIG. 3 illustrates an example flow chart of method 300 for mitigating trailer sway using the towing vehicle's steering system. The method 300 begins at step 305 when the electronic controller 130 determines an oscillation of the vehicle 105. In some examples, the electronic controller 130 is configured to determine a current yaw rate of the vehicle 105 to determine oscillation of the vehicle 105, based on input from the sensor set 160 or other sensors. For example, oscillation could be determined when the current yaw rate of the vehicle 105 deviates from an expected yaw rate of the vehicle 105 when there is no steering input from a driver. In some examples, the expected yaw rate may be determined by the electronic processor 140. In some examples, the oscillation of vehicle 105 may be determined by the electronic controller 130 based on a lateral acceleration value of the vehicle 105, a longitudinal acceleration value of the vehicle 105, a steering angle value, a vehicle speed value, or a brake torque value that are sensed by sensor set 160, the master cylinder pressure sensor 215, the steering sensor 225, and other sensors.

At step 310*a*, the electronic processor 140 determines a target yaw value (e.g., a target yaw rate value) to control the vehicle steering system 220 to mitigate the trailer sway. The target yaw value may be configured to include a target steering wheel angle based on input from the sensor set 160 and/or other sensors. The target yaw value is configured to modify a current yaw value to correct the oscillation of the vehicle 105. At step 310*b*, the electronic processor 140 determines a target deceleration value to control the vehicle braking system 210. The target deceleration value corresponds to a threshold speed value of the vehicle 105. If trailer sway and corresponding oscillation of the vehicle 105 occurs while the speed of the vehicle 105 is above the threshold speed value, the trailer sway can grow without bound. In some examples, the target yaw value is applied to the vehicle steering system 220 and the target deceleration value is applied to the vehicle braking system 210 to mitigate trailer sway and decelerate the vehicle 105 from the current speed of the vehicle 105 to below the threshold speed value of the vehicle 105. A greater target deceleration value will decelerate the vehicle below the threshold speed value faster and will require a greater target yaw value to prevent instability of the vehicle 105 from greater levels of vehicle oscillations. The instability of the vehicle 105 is caused by an increase in trailer instability from the deceleration of vehicle 105 until the threshold speed value is reached. Although not shown in FIG. 3, in some examples, a trailer deceleration value may be applied to the trailer 110 via a trailer braking system to improve the stability of the trailer 110 and the vehicle 105. In these examples, the deceleration of the trailer 110 increases the threshold speed value of the vehicle 105 and reduces the target yaw value applied to the vehicle steering system 220.

At step 315*a*, the electronic processor 140 communicates the target yaw value to the vehicle steering system 220 via the interface 150. The vehicle steering system 220 applies the target yaw value to correct the current yaw value, this may be done, for example, by changing the steering wheel angle of the vehicle 105. As a result, applying the target yaw value corrects the deviation in yaw rate of the vehicle 105 to correspond to the expected yaw rate of the vehicle 105. In some examples, the vehicle steering system 220 uses counter steering of the front wheels of the vehicle 105 based on the target yaw value to correct the current yaw value. In some examples, the vehicle steering system 220 may apply the target yaw value by using front wheel, rear wheel, or individual wheel steering. At step 315*b*, the electronic controller 130 communicates the target deceleration value to the vehicle braking system 210 via the interface 150. The vehicle braking system 210 applies the target deceleration value to the wheels of the vehicle 105 via asymmetrical or symmetrical braking of the wheels of the vehicle 105 to mitigate trailer sway.

The target yaw value is determined by the electronic processor 140 via a target steering wheel angle. In some examples, the target steering wheel angle is determined based on a function of counter steer (e.g., the target steering wheel angle direction is opposite of a current steering wheel angle). The target yaw value can be determined by converting a target yaw torque into a target steering wheel angle, converting a target yaw rate change to a target steering wheel angle, or a combination of both. In some examples, the target steering wheel angle can be determined via a feed forward control on yaw rate deviation. In one example, the electronic processor 140 determines the target steering wheel angle via Equation 1.

$$\delta_F = \frac{c_F c_R \times (l_F + l_R)^2 + m \times (c_R l_R - c_F l_F) \times v_x^2}{c_F c_R \times (l_F + l_R) \times v_x} \times \dot{\Psi} \quad \text{Equation 1}$$

Where $\delta_F$ is the steered front wheel angle, $c_F$ is the front axle cornering stiffness, $c_R$ is the rear axle cornering stiffness, $I_F$ is the distance from center of gravity to the front axle, $I_R$ is the distance from center of gravity to the rear axle, $v_x$ is the vehicle longitudinal speed, m is the vehicle mass, and $\dot{\Psi}$ is the vehicle yaw rate.

In some examples, an additional target yaw value may need to be determined and applied to overcome an offset of the steering wheel angle. The additional target yaw value (e.g., delta steer angle target or offset yaw value) is determined by the electronic processor 140 from a target yaw torque of the steering wheel of the vehicle 105. The yaw rate deviation value is used to determine a yaw torque target. The yaw torque target is then converted to a steering wheel angle which is used as the target yaw value in step 315a of method 300 and step 435 of method 400. The electronic processor 140 determines the additional target steering wheel angle via Equation 2.

$$\delta_F = -\frac{c_F + c_R}{c_F c_R \times (l_F + l_R)} \times M_z \quad \text{Equation 2}$$

Where $\delta_F$ is the (delta) steered front wheel angle, $c_F$ is the front axle cornering stiffness, $c_R$ is the rear axle cornering stiffness, $I_F$ is the distance from center of gravity to the front axle, $I_R$ is the distance from center of gravity to the rear axle, and $M_z$ is the yaw target torque.

In some instances, the electronic processor 140 continuously determines a yaw target value based on the parameters listed in Equation 1 and Equation 2 in order to correct trailer sway and corresponding vehicle oscillation detection by the electronic controller 130.

At step 320, the electronic controller 130 determines if the trailer oscillation has been mitigated. If the electronic controller 130 determines that oscillation of the vehicle 105 has not been mitigated (after steps 315a and 315b), then method 300 returns to steps 310a and 310b to determine a new target yaw value and a new target deceleration value to correct the specific oscillation that was determined at step 305. If the sensor set 160 does not detect any further oscillation of the vehicle 105 after steps 315a and 315b, then the method 300 proceeds to step 325 and the oscillation correction is ended for the specific oscillation that was determined at step 305. Even though the specific oscillation determined at step 305 is mitigated, the electronic controller 130 is configured to continuously determine the current yaw rate or steering wheel angle, the current braking torque or wheel speed, and the current acceleration or current deceleration of the vehicle 105 to detect new oscillation of the vehicle 105 and trailer 110.

Figure 4A:
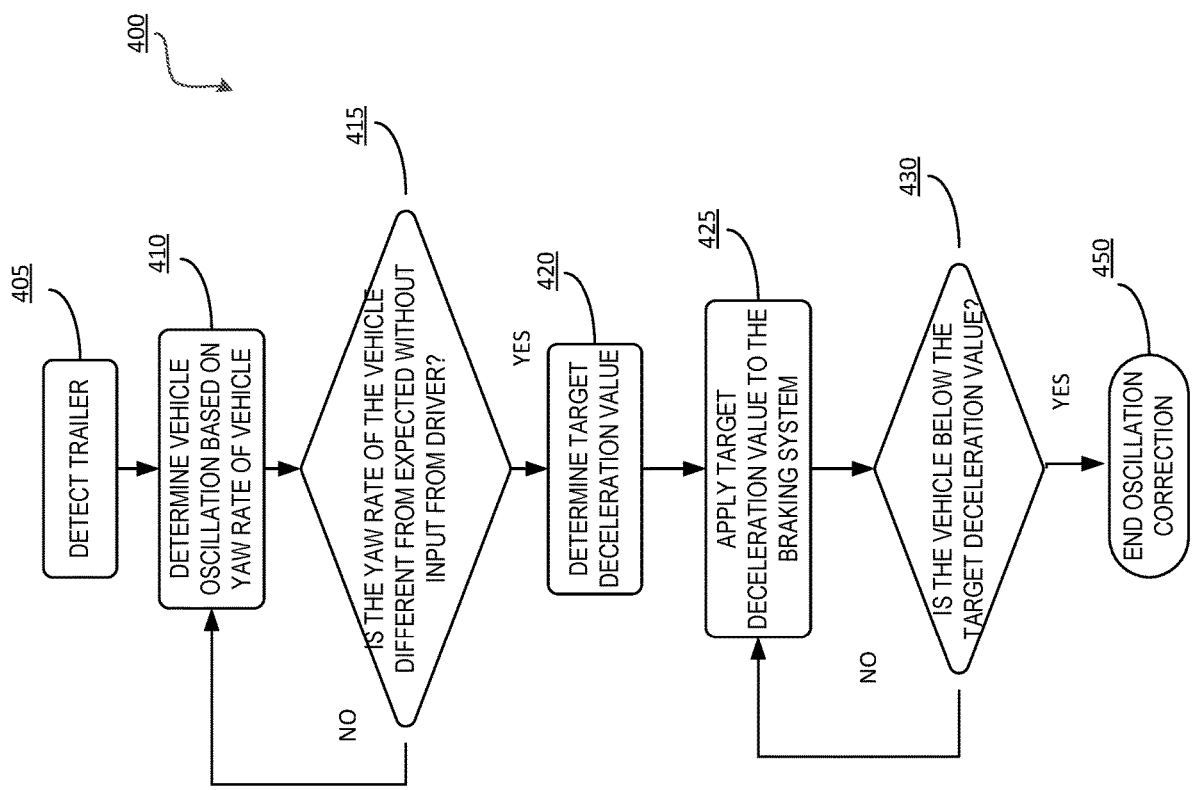
FIG. 4A and FIG. 4B illustrates an example flow chart of a method for determining a target yaw value and a target deceleration value for mitigating trailer sway with steering systems.
Figure 4B:
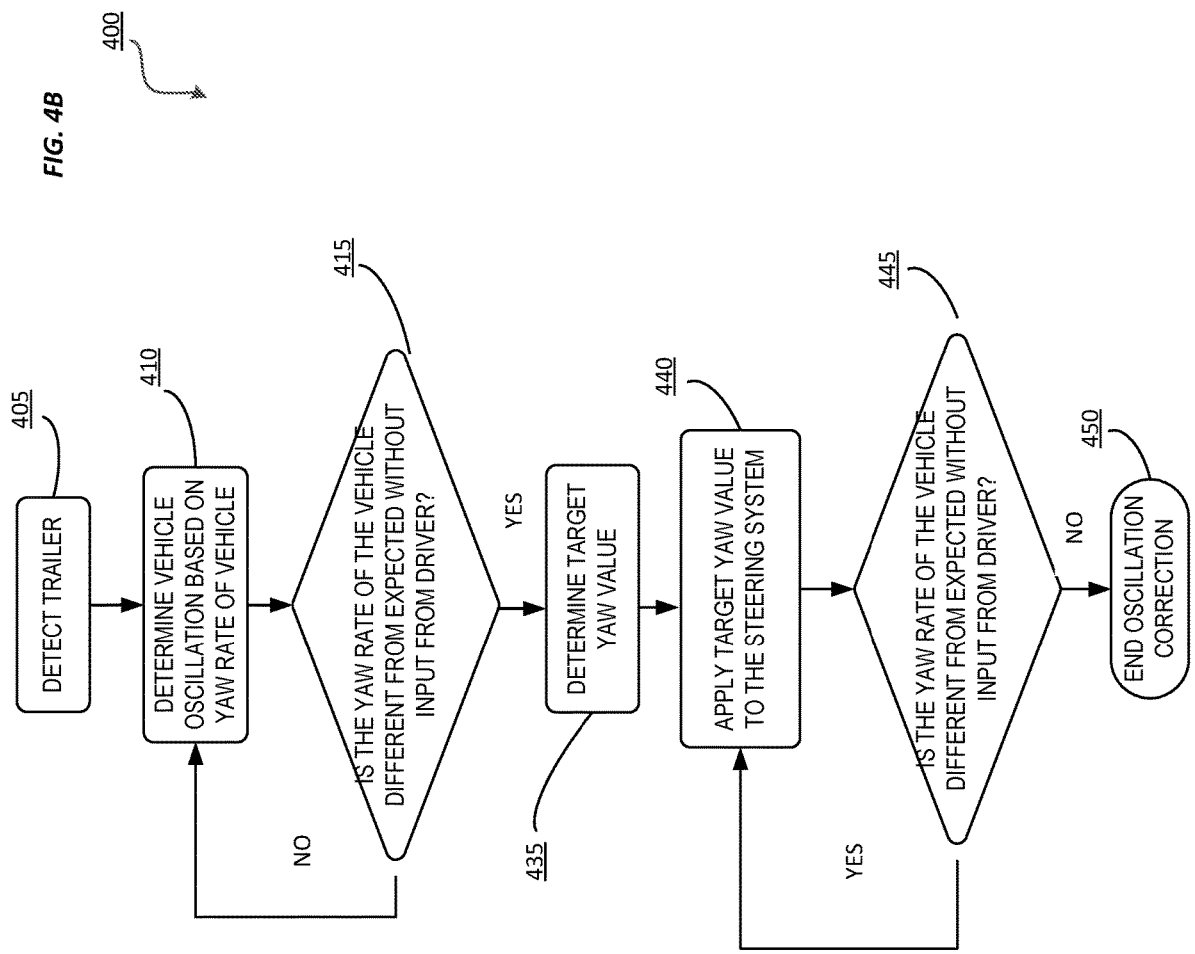

FIG. 4A and FIG. 4B illustrates an example flow chart of method 400 for determining a target yaw value and a target deceleration value for mitigating trailer sway with steering systems. Although shown as separate processes in FIG. 4A and FIG. 4B, the target yaw value and the target deceleration value are applied simultaneously to the vehicle steering system 220 and the vehicle braking system 210, respectively, to mitigate trailer sway.

In FIG. 4A, the method 400 begins at step 405 when the electronic processor 140 detects that the trailer 110 is connected to the vehicle 105 as described previously in regard to FIG. 1 and FIG. 2. Once the trailer 110 is detected, the method 400 proceeds to step 410. At step 410, the electronic controller 130 determines an oscillation of the vehicle 105 based on the yaw rate of the vehicle 105, similarly, to step 305 of method 300.

At step 415, the electronic controller 130 determines if the yaw rate of the vehicle 105 is different from the expected yaw rate of the vehicle 105 without input from a driver. If the yaw rate of the vehicle 105 is determined to be the same as the expected yaw rate of the vehicle 105 without input from the driver, the method 400 returns to step 410 to determine if oscillation of the vehicle 105 is occurring. If the yaw rate of the vehicle 105 is different than the expected yaw rate of the vehicle 105 without input from the driver, then the vehicle 105 is determined to be oscillating via the trailer 110 sway and the method 400 proceeds to step 420.

At step 420, the electronic processor 140 determines a target deceleration value to slow the vehicle 105 below the target deceleration value before trailer sway mitigation can occur. The target deceleration value is determined based on a difference between a current speed value of the vehicle 105 and the threshold speed value that vehicle 105 must reach before the trailer sway mitigation can occur.

At step 425, the electronic processor 140 communicates the target deceleration value to the vehicle braking system 210 via the interface 150. The vehicle braking system 210 controls asymmetrical or symmetrical braking of the wheels of the vehicle 105 to slow the vehicle 105 below the target deceleration value.

At step 430, the electronic processor 140 determines if the vehicle 105 is below the target deceleration value. If the current vehicle speed is greater than a target vehicle speed determined by the target deceleration value, the method 400 returns to step 425, where the electronic processor 140 instructs the vehicle braking system 210 to continue to apply asymmetrical or symmetrical braking to the wheels of the vehicle 105 based on the target deceleration value. If the current vehicle speed is determined to be less the target vehicle speed determined by the target deceleration value, the method 400 proceeds to step 450. At step 450, the oscillation correction is ended for the oscillation that was determined at step 410. Even though the oscillation is mitigated, the electronic controller 130 continues to determine the current yaw rate or steering wheel angle, the current braking torque or wheel speed, and the current acceleration or current deceleration of the vehicle 105 to detect new oscillation of the vehicle 105 and trailer 110.

The process shown in FIG. 4B, includes the same steps 405, 410, and 415 as shown in FIG. 4A. At step 415, if the yaw rate of the vehicle 105 is different than the expected yaw rate of the vehicle 105 without input from the driver, then the electronic processor 140 determines that the vehicle 105 is oscillating due to trailer sway and the method 400 proceeds to step 435. At step 435, the electronic processor 140 determines a target yaw value (e.g., a target yaw rate value), similarly, to step 310a of method 300. The electronic processor 140 determines a target yaw value (e.g., a target yaw rate value) to be applied to the vehicle steering system 220 to mitigate the trailer sway. The target yaw value may be configured to include a target steering wheel angle. The target yaw value is configured to modify a current yaw value to correct the oscillation of the vehicle 105.

At step 440, the electronic processor 140 communicates the target yaw value to the vehicle steering system 220 via the interface 150, similarly, to step 315a of method 300. The vehicle steering system 220 applies the target yaw value to correct the current yaw value, this may be done by changing the steering wheel angle of the vehicle 105. In some examples, the vehicle steering system 220 uses counter steering of the front wheels of the vehicle 105 based on the target yaw value to correct the current yaw value. In some examples, the vehicle steering system 220 may apply the target yaw value by using front wheel, rear wheel, or individual wheel steering. In some examples, only the target yaw value is applied to the vehicle steering system 220 to mitigate trailer sway.

In some examples, the target yaw value may be distributed between the vehicle braking system 210 (for example, skid-steer braking) and the vehicle steering system 220. The distribution of the target yaw value is predetermined based on the manufacturer specifications and may be set based on a number of concerns or factors. In some instances, the factors may be sensed by the master cylinder pressure sensor 215, the steering sensor 225, the sensor set 160, other sensors, or the factors may be constants provided by the vehicle manufacturer. Example factors include NVH (e.g., noise, vibration, harshness), a brake torque response, a steering response, a vehicle load distribution, a driver input, etc. In some instances, mitigating trailer sway via the vehicle braking system 210 alone is not as effective as desired. The mitigation of trailer sway and vehicle oscillations benefits from the use of the vehicle steering system 220 as opposed to solely using the vehicle braking system 210 in these instances. These instances include circumstances where the vehicle 105 has a narrow vehicle track width or a long vehicle wheelbase. Circumstances where braking alone is not as effective as desired also include low speed circumstances, low road friction circumstances, slow brake actuation circumstances, and circumstances in which driver steering interventions worsen trailer sway. In some instances, the driver of the vehicle 105 may apply an incorrect steering wheel angle during vehicle oscillation that leads to a worsening of vehicle oscillations. The incorporation of the vehicle steering system 220 to mitigate trailer sway and vehicle oscillations provides a faster and more direct response to correcting oscillations by helping to prevent an incorrect steering wheel angle applied as a result of driver input.

If the target deceleration during trailer sway mitigation is low (e.g., the vehicle 105 is driving down a slope), deceleration from vehicle braking system 210 may exceed the target deceleration value. In this case, the vehicle steering system 220 may be configured to decelerate the vehicle 105 in conjunction with the vehicle braking system 210. To accomplish this, a portion of the target yaw torque can be applied by the vehicle steering system 220. The portion of the target yaw torque for steering may be included in the target yaw value. In one example, the electronic processor 140 determines the additional yaw torque via Equation 3.

$$M_{SteeringTarget} = \max(M_{YawDampingTarget} - \frac{a_{xtarget} \times m \times w}{2}, 0) \quad \text{Equation 3}$$

Where $M_{SteeringTarget}$ is the target yaw torque for steering, $M_{YawDampingTarget}$ is the total target yaw torque, $a_{xtarget}$ is the target deceleration of the trailer sway, m is the vehicle mass, and w is the track width.

At step 445, the electronic controller 130 determines if the yaw rate of the vehicle 105 is different from the expected yaw rate of the vehicle 105 without input from the driver. If the yaw rate of the vehicle 105 is different than the expected yaw rate of the vehicle 105 without input from the driver, the method 400 returns to step 440, where the electronic processor 140 instructs the vehicle steering system 220 to continue to apply the target yaw value to the steering wheel of the vehicle 105. If the yaw rate of the vehicle 105 is determined to be the same as the expected yaw rate of the vehicle 105 without input from the driver, the method 400 proceeds to step 450. At step 450, the oscillation correction is ended for the oscillation that was determined at step 410. Even though the oscillation determined at step 410 is mitigated, the electronic controller 130 is configured to continuously determine the current yaw rate or steering wheel angle, the current braking torque or wheel speed, and the current acceleration or current deceleration of the vehicle 105 to detect new oscillation of the vehicle 105 and trailer 110. As noted, although they are shown as separate processes in FIG. 4A and FIG. 4B, the target yaw value is applied to the vehicle steering system 220 and the target deceleration value is applied to the vehicle braking system 210 simultaneously to mitigate trailer sway and reach the threshold speed value. In other words, step 420 of FIG. 4A and step 435 of FIG. 4B occur simultaneously after the completion of step 415. It has been found that yaw damping is needed as the vehicle 105 decelerates to mitigate trailer sway.

The vehicle steering system 220 may be implemented as one of two broad kinds of steering systems which are sometimes referred to as "fully linked" and "driver decoupled." The electronic processor 140 interacts with each kind of steering system differently. A fully linked steering system includes a mechanically linked connection between a steering wheel and the plurality of steered wheels. Any driver input to the yaw rate or angle of the steering wheel leads directly to a road wheel angle change. Therefore, the performance of the trailer sway mitigation with the steering system is limited due to driver behavior (e.g., the driver could counter steer away from the target yaw value in step 315a or step 440). A fully linked steering system could include electric power steering ("EPS"), hydraulic power steering ("HPS") with a motor torque overlay, etc.

In a fully linked system, driver input is transferred directly to the steering wheels and any input from the motor is noticeable by the driver. The steered wheels are placed in the same direction as a steering wheel position. The example method 400 controls the vehicle steering system 220 in a manner that facilitates and compensates for driver input to help mitigate trailer sway. The system 100 can facilitate and compensate in two different ways for a fully linked steering system—active compensation and passive compensation. Active compensation includes the electronic processor 140 providing the target yaw value as a steering recommendation to the driver (e.g., conveying a steering movement of the steering wheel). The steering recommendation makes steering the steering wheel in accordance with the target yaw value easier. However, increased effort is needed to steer the steering wheel in a direction to make the trailer sway and vehicle 105 oscillation worse.

Passive compensation includes the electronic processor 140 providing the target yaw value to the vehicle steering system 220 as a yaw value that keeps the steering wheel fixed (e.g., conveying a steering movement of the steering wheel). An increased level of effort is required to steer the steering wheel in any direction. Therefore, steering is not actively compensated. Passive compensation ensures that the steering input does not worsen the trailer sway and corresponding vehicle oscillation. Step 315b of method 300 or step 425 of method 400 may be carried out in addition to passive compensation to apply asymmetrical or symmetrical braking to the steered wheels via the vehicle braking system 210. The effectiveness of braking intervention increases with passive compensation.

As noted, in some examples, the vehicle steering system 220 is a driver decoupled steering system. A driver decoupled steering system includes an electrical linkage (a so-called "drive by wire" connection) between the steering wheel and the steered wheels via an actuator mechanically connected to the steered wheels. In a driver decoupled steering system, the steered wheel can move independently of the driver's steering input. Therefore, trailer sway mitigation with steering is independent of a direct steering input. Examples of driver decoupled steering systems include a steer by wire system, a rear steer system with EPS, active front steering ("AFS"), etc.

In a driver decoupled system, the electronic processor 140 provides a steering wheel angle (e.g., conveying a sensed movement of the steering wheel), as the target yaw value in step 315*a* of method 300 or step 440 for method 400, to the vehicle steering system 220 to compensate the trailer sway and corresponding vehicle 105 oscillation. Any steering input is used as an offset to the provided steering wheel angle. The electronic processor 140 communicates an angle which is a counter steer against the direction of the trailer sway. The electronic controller 130 determines an amplitude level and a phase value of the steering wheel angle or the yaw torque that is used as the target yaw value. The amplitude level and the phase level can be adjusted in real time via the electronic processor 140 to mitigate trailer sway. In vehicles that include advanced driver assistance systems ("ADASs") and autonomous driver features in which the driver of the vehicle 105 may not have any hands on the steering wheel, fully linked systems can be viewed as driver decoupled systems. In those instances, the electronic processor 140 may provide a steering wheel angle with an EPS.

Regardless of type of vehicle steering system 220 used in the vehicle 105, one advantage to using the vehicle steering system 220 to counter steer the front wheels of the vehicle 105 via a target yaw value, is that the vehicle steering system 220 provides a greater influence over the yaw rate of the vehicle 105 compared to asymmetric braking of the vehicle 105.

Thus, examples provide, among other things, a steering system for mitigating trailer sway, a braking system for mitigating trailer sway, and an electronic processor. Various features, advantages, and examples are set forth in the following claims.

What is claimed is:

1. A system for mitigating a sway of a trailer, the system comprising:
   a sensor set configured to sense a plurality of operating characteristics of a vehicle that includes a steering system having a steering wheel and steered wheels;
   an electronic processor configured to:
      receive the plurality of operating characteristics from the sensor set,
      determine whether the trailer is swaying based on the plurality of operating characteristics,
      determine, in response to the trailer swaying, a target deceleration,
      determine, in response to the trailer swaying, a target yaw value,
      modify a current yaw value to counter the trailer sway until reaching the target yaw value, and
      control the steering system based on the current yaw value and an offset yaw value.

2. The system of claim 1, wherein the electronic processor is further configured to: determine a current deceleration, and
   control braking forces to one or more vehicle wheels based on a deviation between the target deceleration and the current deceleration to slow the vehicle below a threshold speed value.

3. The system of claim 1, wherein the target yaw value is determined based on a function of counter steer.

4. The system of claim 1, wherein the steering system comprises a mechanical linkage between the steering wheel and the steered wheels that conveys steering movement of the steering wheel to the steered wheels.

5. The system of claim 1, wherein the steering system comprises an electrical linkage between the steering wheel and the steered wheels that conveys a sensed movement of the steering wheel to an actuator mechanically connected to the steered wheels.

6. The system of claim 1, wherein the plurality of operating characteristics includes a yaw rate deviation.

7. A method for mitigating a sway of a trailer, using a vehicle steering system, the method comprising:
   receiving, via a sensor set, a plurality of operating characteristics of a vehicle;
   determining, via a controller, if the trailer is swaying;
   determining, via the controller, a target deceleration;
   determining, via the controller, a target yaw value; and
   controlling the vehicle steering system based on a current yaw value and an offset yaw value to counter the trailer sway until the target yaw value is reached.

8. The method of claim 7, wherein the method further comprises: determining a current deceleration, and
   controlling braking forces to one or more vehicle wheels based on a deviation between the target deceleration and the current deceleration to slow the vehicle below a threshold speed value.

9. The method of claim 7, further comprising determining the target yaw value based on a function of counter steer.

10. The method of claim 7, further comprising conveying steering movement of a steering wheel to steered wheels via a steering system with a mechanical linkage between the steering wheel and the steered wheels of the vehicle.

11. The method of claim 7, further comprising conveying a sensed movement of a steering wheel to an actuator mechanically connected to steered wheels via a steering system with an electrical linkage between the steering wheel and the steered wheels of the vehicle.

12. The method of claim 7, wherein the plurality of operating characteristics includes a yaw rate deviation.

13. The method of claim 7, wherein controlling the vehicle steering system based on the current yaw value to counter the trailer sway further comprises:
   correcting oscillations to prevent an incorrect steering wheel angle applied as a result of a driver input.

14. A method for mitigating a sway of a trailer, the method comprising:
   receiving, via sensor set, a plurality of operating characteristics of a vehicle; determining, via a controller, if the trailer is swaying;
   determining, via the controller, a target deceleration;
   determining, via the controller, a target yaw value;
   determining, via the controller, an offset yaw value;
   modifying a current yaw value to counter the trailer sway until the target yaw value plus the offset yaw value is reached.

15. The method of claim 14, wherein the method further comprises: determining a current deceleration, and controlling braking forces to one or more vehicle wheels based on a deviation between the target deceleration and the current deceleration to slow the vehicle below a threshold speed value.

16. The method of claim 14, wherein modifying the current yaw value to counter trailer sway further comprises: correcting oscillations to prevent an incorrect steering wheel angle applied as a result of a driver input.

\* \* \* \* \*